(12) United States Patent
Miller et al.

(10) Patent No.: US 12,162,094 B2
(45) Date of Patent: Dec. 10, 2024

(54) LASER WELDING ENCLOSURE (71) Applicant: Illinois Tool Works Inc., Glenview, IL (US)

(72) Inventors: Erik Miller, Appleton, WI (US); Brian Atkinson, Darlington, SC (US); Kevin Pagano, Algonquin, IL (US)

(73) Assignee: Illinois Tool Works Inc., Glenview, IL (US)

( * ) Notice: Subject to any disclaimer, the term of this patent is extended or adjusted under 35 U.S.C. 154(b) by 498 days.

(21) Appl. No.: 17/209,475

(22) Filed: Mar. 23, 2021

(65) Prior Publication Data

US 2021/0299794 A1    Sep. 30, 2021

Related U.S. Application Data

(60) Provisional application No. 63/001,980, filed on Mar. 30, 2020.

(51) Int. Cl.
*B23K 26/70*    (2014.01)

(52) U.S. Cl.
CPC ................... *B23K 26/702* (2015.10)

(58) Field of Classification Search
CPC .... B23K 26/127; B23K 26/12; B23K 9/1006; B23K 26/032; B23K 26/123; B23K 26/128; B23K 26/706; B23K 2101/18; B23K 26/042; B23K 26/08; B23K 26/0838; B23K 26/0884; B23K 26/16; B23K 26/206; B23K 26/40; B23K 26/702; B23K 9/1075; B23K 9/16; B23K 9/32; B23K 15/0013; B23K 15/0046; B23K 15/0086; B23K 15/0093; B23K 15/02; B23K 15/06; B23K 2101/001; B23K 2101/04; B23K 2101/34; B23K 2101/35; B23K 2103/14; B23K 2103/166; B23K 2103/50; B23K 26/0006; B23K 26/0093; B23K 26/035; B23K 26/037; B23K 26/0622; B23K 26/0643; B23K 26/0823; B23K 26/083; B23K 26/0861; B23K 26/125; B23K 26/142; B23K 26/1464; B23K 26/1476; B23K 26/342;
(Continued)

(56) References Cited

U.S. PATENT DOCUMENTS

2,822,109 A * 2/1958 Tangard ................... F16J 13/10
                                                    27/DIG. 1
3,692,059 A * 9/1972 Ice, Jr. ..................... F16L 55/10
                                                    220/233
(Continued)

*Primary Examiner* — Chris Q Liu
(74) *Attorney, Agent, or Firm* — McAndrews, Held & Malloy, Ltd.

(57) ABSTRACT

Systems and methods are disclosed for an enclosure providing a sealed environment. The enclosure employs movable paneling that seals an area for a laser welding cell, while allowing access for an operator to load a workpiece in and unload the workpiece from a welding cell. Barriers are arranged on the enclosure, such that in a closed configuration activation of a pneumatic tube forces the barriers to extend toward a rotated paneling, such that the edges of the enclosure contact or overlap with the edges of the paneling to result in a light-tight seal. Presence of the fluid increases the pressure in the tube such that an external boundary of the tube expands, forcing the barrier toward the edges of the paneling, thereby closing the gap and providing a light-tight enclosure.

16 Claims, 7 Drawing Sheets

(58) Field of Classification Search
CPC ........ B23K 26/38; B23K 26/60; B23K 26/70;
B23K 37/0217; B23K 37/0229; B23K
37/0235; B23K 37/0294; B23K 37/0408;
B23K 37/0461; B23K 37/053; B23K
37/06; B23K 37/08; B23K 9/02; B23K
9/0282; B23K 9/0286; B23K 9/1043;
B23K 9/1068; B23K 9/164; B23K 9/325
USPC .... 219/121.86, 121.68, 121.82, 121.63, 136,
219/121.13, 121.6, 121.67, 121.78,
219/121.84, 124.31, 133, 158; 220/233,
220/239, 228, 323, 378
See application file for complete search history.

(56) References Cited

U.S. PATENT DOCUMENTS

| | | | | |
|---|---|---|---|---|
| 5,247,901 | A * | 9/1993 | Landon | A01K 1/031 |
| | | | | 119/419 |
| 5,274,212 | A * | 12/1993 | Campbell | B23K 26/127 |
| | | | | 269/224 |
| 6,662,673 | B1 * | 12/2003 | Olgado | C25D 17/001 |
| | | | | 204/279 |
| 6,669,780 | B2 * | 12/2003 | Browning | B05B 14/45 |
| | | | | 118/308 |
| 8,461,472 | B2 * | 6/2013 | Domschot | B23K 37/0461 |
| | | | | 219/136 |
| 8,876,217 | B1 * | 11/2014 | Medlen | B60P 1/286 |
| | | | | 296/100.1 |
| 9,114,474 | B2 * | 8/2015 | Osicki | B23K 37/006 |
| 9,778,707 | B1 * | 10/2017 | San Clemente | G06F 1/182 |
| 2003/0146194 | A1 * | 8/2003 | Bowker | D06C 23/02 |
| | | | | 219/121.68 |
| 2012/0029775 | A1 * | 2/2012 | Peters | F15B 11/162 |
| | | | | 700/282 |
| 2012/0248082 | A1 * | 10/2012 | O'Connell | B23K 9/16 |
| | | | | 219/136 |
| 2014/0112828 | A1 * | 4/2014 | Grant | A61M 1/362261 |
| | | | | 210/232 |
| 2014/0116992 | A1 * | 5/2014 | Walker | B23K 37/006 |
| | | | | 219/130.21 |
| 2014/0311405 | A1 * | 10/2014 | Mauck | B41J 2/01 |
| | | | | 29/402.03 |
| 2016/0096691 | A1 * | 4/2016 | Gross | B65G 51/44 |
| | | | | 406/10 |
| 2016/0325284 | A1 * | 11/2016 | Camillo | B01L 3/50851 |
| 2017/0080730 | A1 * | 3/2017 | Mauck | H01L 33/005 |
| 2017/0087682 | A1 * | 3/2017 | Leonhard | F16M 1/00 |
| 2017/0190001 | A1 * | 7/2017 | Brown | F16P 1/06 |
| 2018/0058069 | A1 * | 3/2018 | Mello | B29C 44/10 |
| 2019/0118696 | A1 * | 4/2019 | McGregor | B62D 63/061 |
| 2019/0154029 | A1 * | 5/2019 | Jochman | F04B 49/225 |
| 2019/0174651 | A1 * | 6/2019 | Crawford | H05K 7/20836 |

* cited by examiner

LASER WELDING ENCLOSURE

BACKGROUND

Operational requirements for industrial lasers are based on laser output energy or power, radiation wavelengths, exposure duration, and cross-sectional area of the laser beam at the point of interest. Many industrial lasers will require an environment that is properly interlocked and labeled protective enclosure. In some cases, the enclosure may be a room (walk-in protective housing), which prevents operation when operators are accessing the area with the laser, such as loading and unloading parts.

For example, some lasers used for material processing are Class 4 lasers. A Class 4 laser is an intense and powerful class of laser (including all lasers that exceed the Class 3B AEL). A Class 4 laser can be installed in a working cell that is certified as a Class 1 enclosure. However, a Class 1 enclosure must guarantee that the light emitted from the Class 4 laser stays within the enclosure or is safe outside of the enclosure under all conditions of normal use.

SUMMARY

The present disclosure generally relates to laser material processing. More specifically, the disclosure relates to systems and methods for an enclosure providing a sealed welding environment. In particular, the enclosure employs movable paneling that seals an area for a robotic laser welding cell, while allowing access for an operator to load a workpiece in and unload the workpiece from the welding cell.

In some examples, the barrier(s) are arranged on a wall of the enclosure, such that in the closed configuration activation of a pneumatic tube forces the barriers to extend toward the paneling, mating the edges of the enclosure with the edges of the paneling to result in a light-tight seal. In some examples, the pneumatic tube is partially or completely filled with a fluid (e.g., a gas, air, a liquid, a fluid media, etc.) upon activation. The fluid increases the pressure in the tube such that an external boundary of the tube expands. The expansion forces the barrier toward the edges of the paneling, thereby closing the gap and providing a light-tight enclosure.

These and other aspects of the embodiments are set forth below in the detailed description with reference to the accompanying drawings.

BRIEF DESCRIPTION OF THE DRAWINGS

The figures are not necessarily to scale. Where appropriate, similar or identical reference numbers are used to refer to similar or identical components. In the figures, reference numerals designate corresponding parts throughout the different views.

DETAILED DESCRIPTION

This disclosure relates to systems and methods for an enclosure providing a sealed welding environment. In particular, the enclosure employs movable paneling that seals an area for a robotic laser welding cell, while allowing access for an operator to load a workpiece in and unload the workpiece from the welding cell.

In examples, the moveable paneling or arc screen can transition between an open configuration (e.g., to allow the paneling to rotate) and a closed configuration (e.g., to seal the paneling). The paneling moves by rotating about an axis, whereby a first side of the paneling is presented to an operator (e.g., to load and unload a part) and a second side of the paneling is presented in the welding cell (e.g., for a robotic laser welder to perform a laser welding operation), or vice versa. For example, a gap is maintained between edges of the paneling and edges of the enclosure to allow for free rotation of the paneling in the open configuration. As the paneling rotates to a closed configuration, the edges of the paneling align with edges of the enclosure (e.g., one or more of a wall, a floor, and/or a top of the enclosure). In the closed configuration, one or more devices are activated to extend a barrier to close the gap and form a light tight seal between the edges of the paneling and the edges of the enclosure. In some examples, a light tight seal is defined as contact or overlap between paneling and enclosure edges such that a light beam is prevented from a double-bounce between an interior of the enclosure and the surrounding environment.

In some examples, the barrier(s) are arranged on a wall of the enclosure, such that in the closed configuration activation of a pneumatic tube forces the barriers to extend toward the paneling, mating the edges of the enclosure with the edges of the paneling to result in a light-tight seal. In some examples, the pneumatic tube is partially or completely filled with a fluid (e.g., a gas, air, a liquid, a fluid media, etc.) upon activation. The fluid increases the pressure in the tube such that an external boundary of the tube expands. The expansion forces the barrier toward the edges of the paneling, thereby closing the gap and providing a light-tight enclosure. To transition from a closed configuration to an open configuration, the fluid is partially or completely removed from the pneumatic tube, such that the tube deflates thereby retracting the barriers and exposing the gap between edges. In some examples, the barrier(s) and/or the pneumatic tube(s) is additionally or alternatively located on an edge of the paneling.

Conventional sealing systems employ motors and/or linear actuators to extend a barrier. One or more such motors would be located along the length of the barrier to engage with an edge of the paneling. This system required multiple motors and/or mechanical actuators, with increased weight, complexity, and maintenance and manufacturing cost.

Advantageously, the external boundary of the pneumatic tube has a degree of flexibility, which allows pressure within the tube to adjust a location of a force against the barrier as needed (e.g., due to an uneven mounting surface, fabrication tolerances, etc.). Implementing this type of responsiveness would be impractical in a conventional system employing multiple motors and actuators. Additionally, the flexibility of the pneumatic tube allows for the tube to be arranged in small spaces relative to a conventional arrangement of motors and actuators. This advantage allows, among other benefits, limiting the space required to house such motors and actuators in a floor of the enclosure, thereby providing unobstructed access to the enclosure during a loading/unloading procedure.

In disclosed examples, an enclosure providing a sealed environment includes paneling having upper and lower panels that rotate about a horizontal axis to transition between open and closed configurations, the paneling having edges; one or more pneumatic tubes configured to expand in response to an injection of fluid in a closed configuration, and to retract in response to removal of the fluid in an open configuration; and one or more barriers having one or more edges configured to contact or overlap with an edge of the paneling, wherein the one or more pneumatic tubes are arranged between a frame of the enclosure and the one or more edges of the one or more barriers, such that the one or more pneumatic tubes are configured to expand thereby extending the one or more barriers toward the paneling to contact or overlap the one or more edge of the one or more barriers with the edge of the paneling.

In some examples, one or more springs bias the barriers in the open configuration. In examples, a laser welder performs a laser welding operation in the closed configuration. In examples, one or more of clamps or fixtures secure a workpiece in the environment. In examples, the open configuration provides an operator access to the fixturing to load the workpiece into a welding cell.

In some examples, a compressed air source fills the pneumatic tube. In examples, the fluid is one or more of air, gas, or a liquid. In examples, a motor drives rotation of the paneling. In examples, the paneling is configured for rotation without power.

In disclosed examples, an enclosure providing a sealed environment including one or more pneumatic tubes configured to expand in response to an injection of fluid in a closed configuration, and to retract in response to removal of the fluid in an open configuration; and one or more barriers configured to move between the open and closed configurations in response to expansion or retraction of the one or more pneumatic tubes, wherein one or more edges of the one or more barriers is configured to contact or overlap an edge of a panel enclosing the environment in the closed configuration.

In some examples, the one or more pneumatic tubes are arranged between a frame of the enclosure and the one or more barriers. In examples, the one or more pneumatic tubes are configured to expand, thereby extending the barriers toward the panel to mate the edges of the one or more barriers with the edge of the panel. In examples, the panel is an upper panel fixed to a lower panel at a horizontal axis.

In some examples, the paneling is mechanically secured to the enclosure in the closed configuration to prevent rotation of the paneling.

In disclosed examples, an enclosure providing a sealed laser welding environment includes a paneling having upper and lower panels that rotate about a horizontal axis to transition between open and closed configurations, the paneling having edges; one or more pneumatic tubes configured to expand in response to an injection of fluid in a closed configuration, and to retract in response to removal of the fluid in an open configuration; one or more barriers having one or more edges configured to contact or overlap an edge of the paneling, such that the one or more pneumatic tubes are configured to expand thereby extending the one or more barriers toward the paneling to contact or overlap the one or more edge of the one or more barriers with the edge of the paneling; and one or more sensors to monitor alignment of and for gaps between the one or more edge of the one or more barriers with the edge of the paneling.

In some examples, control circuitry is configured to receive sensor data from the one or more sensors; compare the sensor data to one or more threshold values; and activate an interlock in response to the sensor data exceeding the one or more threshold values.

In some examples, the control circuitry is further configured to control one or more features of the enclosure in accordance with an inactive status corresponding to activation of the interlock, the inactive status corresponding to prevention of the one or more features from activating.

In some examples, the one or more features includes a laser welding tool, a robotic system, a mechanism to rotate the paneling, a fluid source, fixturing or clamps, or a combination thereof.

In some examples, the control circuitry is configured to receive sensor data from the one or more sensors; and determine whether a gap exists between respective edges based on the sensor data.

In some examples, the interlock prevents a laser welding operation from commencing in response to a determination that a gap exists between the one or more edge of the one or more barriers with the edge of the paneling.

In some examples, the control circuitry is further configured to control a fluid source or a valve connected to the fluid source to increase a pressure within the pneumatic tube in response to a determination that a gap exists.

As used herein, the terms "first" and "second" may be used to enumerate different components or elements of the same type, and do not necessarily imply any particular order.

The term "welding-type system," as used herein, includes any device capable of supplying power suitable for welding, plasma cutting, induction heating, Carbon Arc Cutting-Air (e.g., CAC-A), and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, the term "welding-type power" refers to power suitable for welding, plasma cutting, induction heating, CAC-A and/or hot wire welding/preheating (including laser welding and laser cladding). As used herein, the term "welding-type power supply" and/or "power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit," or "circuitry," includes any analog and/or digital components, power and/or control elements, such as a microprocessor, digital signal processor (DSP), software, and the like, discrete and/or integrated components, or portions and/or combinations thereof.

The terms "control circuit," "control circuitry," and/or "controller," as used herein, may include digital and/or analog circuitry, discrete and/or integrated circuitry, microprocessors, digital signal processors (DSPs), and/or other logic circuitry, and/or associated software, hardware, and/or firmware. Control circuits or control circuitry may be located on one or more circuit boards that form part or all of a controller, and are used to control a welding process, a device such as a power source or wire feeder, and/or any other type of welding-related system.

As used herein, the term "memory" includes volatile and non-volatile memory devices and/or other storage device.

As used herein, the term "torch," "welding torch," "welding tool" or "welding-type tool" refers to a device configured to be manipulated to perform a welding-related task, and can include a hand-held welding torch, robotic welding torch, gun, gouging tool, cutting tool, or other device used to implement a welding process.

As used herein, the term "welding mode," "welding process," "welding-type process" or "welding operation" refers to the type of process or output used, such as current-controlled (CC), voltage-controlled (CV), pulsed, gas metal arc welding (GMAW), flux-cored arc welding (FCAW), gas tungsten arc welding (GTAW, e.g., TIG), shielded metal arc welding (SMAW), spray, short circuit, CAC-A, gouging process, plasma cutting, cutting process, and/or any other type of welding process.

As used herein, the term "welding program" or "weld program" includes at least a set of welding parameters for controlling a weld. A welding program may further include other software, algorithms, processes, or other logic to control one or more welding-type devices to perform a weld.

Reference will now be made to the exemplary embodiments illustrated in the drawings, and specific language will be used herein to describe the same. It will nevertheless be understood that no limitation of the scope of the concept is thereby intended. Alterations and further modifications of the features illustrated herein, and additional applications of the principles of the examples as illustrated herein, which would occur to one skilled in the relevant art and having possession of this disclosure, are to be considered within the scope of the present disclosure.

Figure 1A:
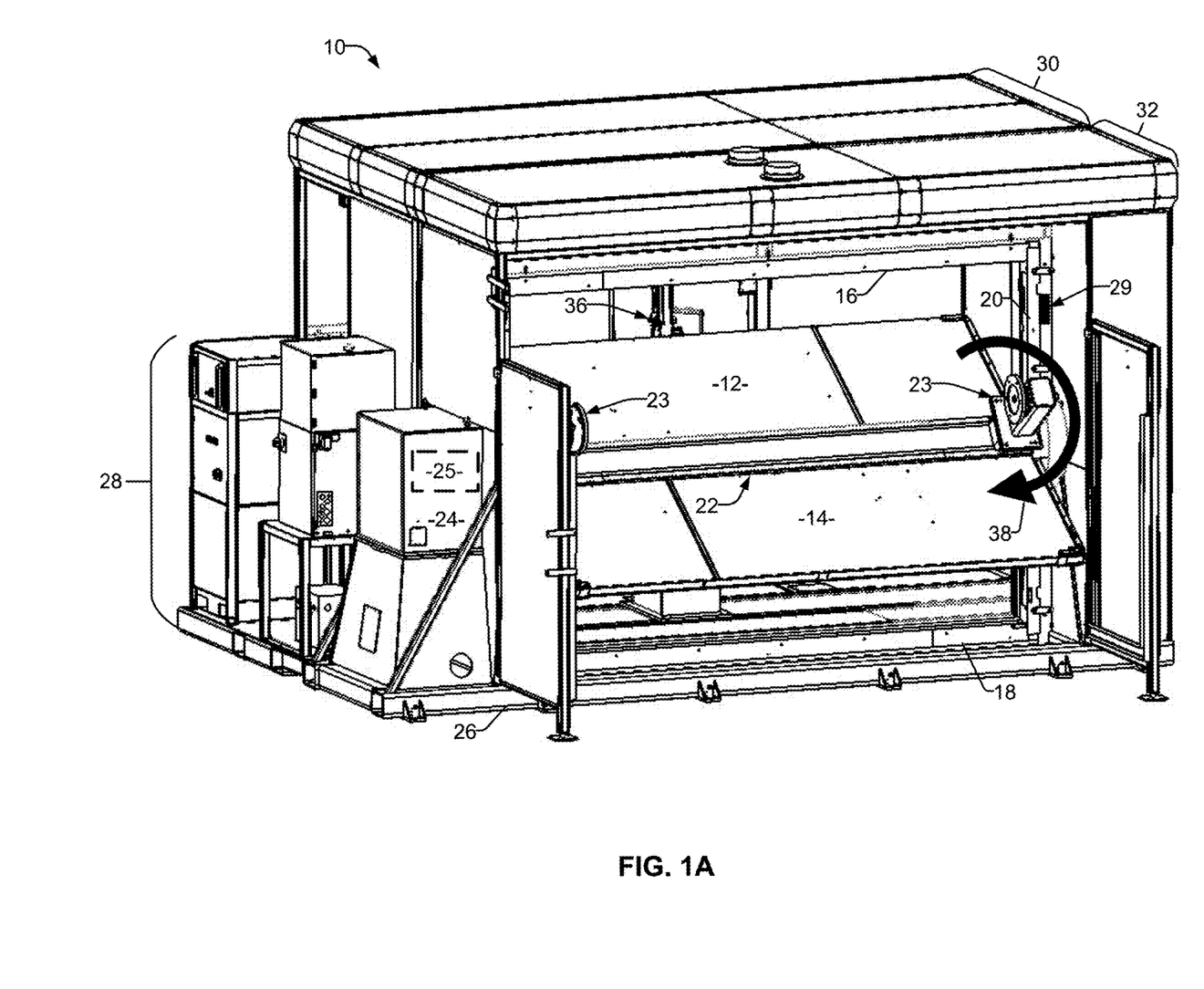
FIG. 1A is a perspective view of an example laser enclosure in a partially open configuration, in accordance with aspects of this disclosure.

FIG. 1A illustrates a perspective view of an example system 10 designed as a two-station machine providing a loading station 32 that can be loaded while a robotic laser welder 36 occupies welding station 30. The system 10 employs movable paneling which includes an upper panel 12 and a lower panel 14 separated by a mid-panel 22, to seal an area within welding station 30 to enclose a robotic laser welding cell. Sealing the enclosure ensures laser welding operations are performed in an enclosed environment that prevents laser light from escaping the enclosure. In this enclosed robotic laser welding cell any laser may be employed, including a Class 4 laser, while meeting Class 1 requirements, at least with respect to outside of the system 10. In some examples, one or more components, including control circuitry 24, power conversion circuitry, etc., can be provided at circuitry or componentry 28. Further, a fluid source can be included, either integrated with the circuitry or componentry 28, and/or external to the enclosure system 10 and connected to one or more tubes, conduits, or valves connected to the enclosure system 10 for provision of controlled and/or pressurized fluid (e.g., to expand tube 50, as disclosed herein). The system 10 can be mounted on a surface by a floor 26.

In a partially rotated (or indexed) configuration, as shown in FIG. 1A, the paneling is rotated about an axis, illustrated by arrow 38, by a panel motor 25 and/or control circuitry 24 or other processing system. In some examples, the paneling can be rotated without the use of power (e.g., a motor). This can be performed manually, with or without the use of tools. In some examples, a release is configured to disengage the panel motor from the paneling, such that the paneling is rotatable without the use of the panel motor and/or control circuitry. The paneling has a first side and a second side, such that in a closed configuration a first side is presented to an operator in the loading station 32 to load and/or unload a part, while the second side is presented to the welding station 30. In the open configuration, the paneling is free to rotate about the axis, which results in the first side and the second side switching. Thus, upon one half rotation (e.g., 180 degrees), the first side will transition from being presented in the loading station 32 to being presented in the welding station 30, and the second side will be presented to the loading station 32. In this closed configuration, the robotic welder 36 performs a welding operation within welding station 30, while the operator has access to the loading station 32. Following a rotation, the flip of paneling sides allows for a new part to be welded, while the operator has access to the loading station 32 to unload a finished part and/or to load a part to be welded (not shown).

A gap is maintained between edges of the paneling and edges of the enclosure to allow for free rotation of the paneling in the open configuration. For example, one or more of the barriers 16, 18 and 20 are spring loaded by springs 55 to bias the barriers away from the paneling (such that the barriers retract when fluid (e.g., air pressure) is released from the pneumatic tube). An example workspace within the welding station 30 can include a movable platform and/or one or more fixtures for holding workpieces to be processed, such as located on the paneling itself, in one or more clamps or fixtures 23.

Figure 1B:
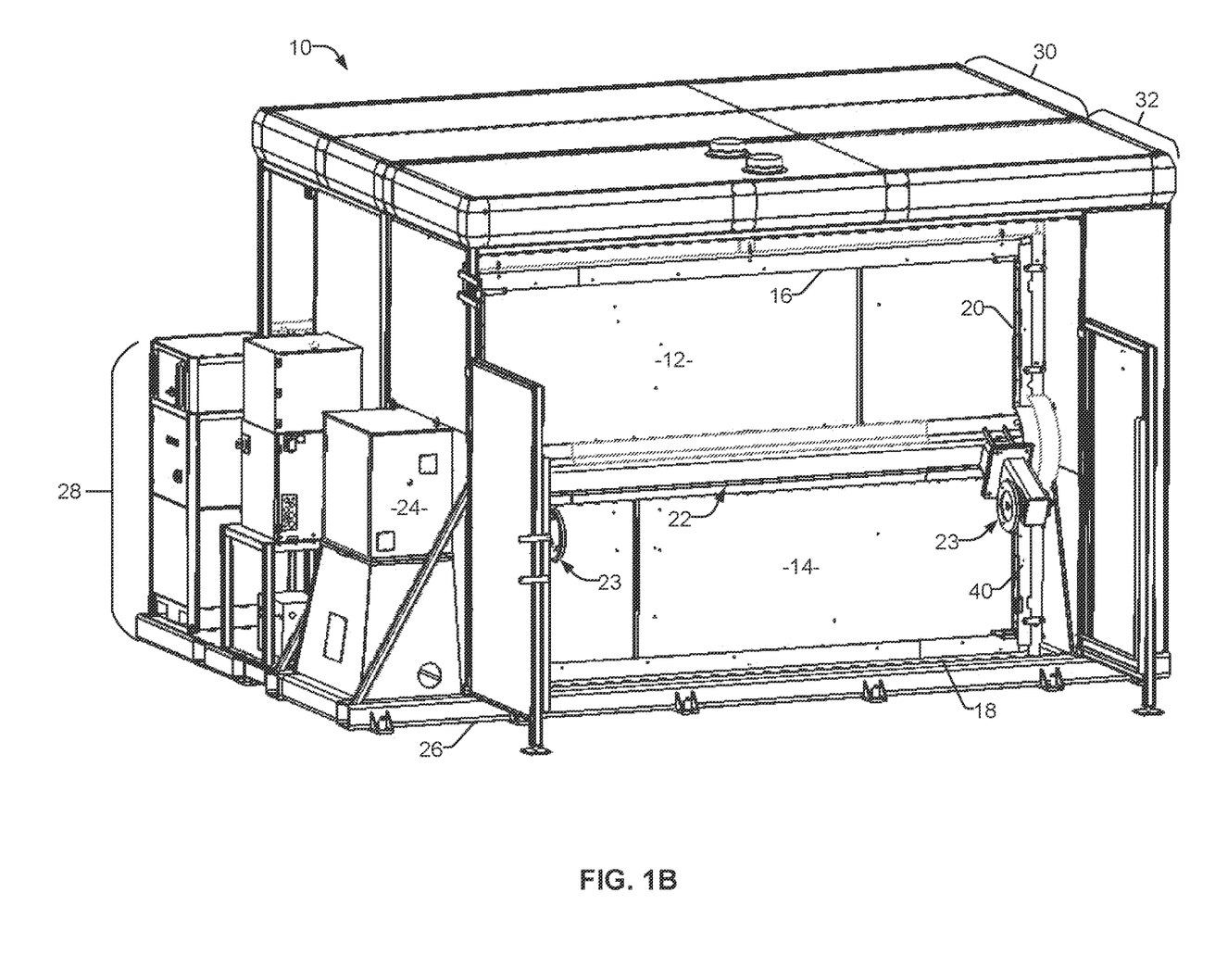
FIG. 1B is a perspective view of an example laser enclosure in a closed configuration, in accordance with aspects of this disclosure.

FIG. 1B illustrates the paneling 12, 14 oriented substantially vertically, such that the edges of the paneling 12, 14 are aligned with the edges of the enclosure at loading station 32. The barriers 16, 18, 20 and 40 have extended toward the edges of the paneling 12, 14, which closes the gap and seals the main weld area within the welding station 30, after the paneling has rotated into the closed configuration. For example, side barriers 20 and 40 have shifted horizontally toward the edges of the paneling 12, 14 to form a seal on the sides of the paneling 12, 14. The top and bottom barriers 16 and 18 are extended toward the top and bottom edges of the paneling 12, 14, respectively, to form a seal.

The barriers 16, 18, 20 and 40 thus may be defined by an L-shaped, U-shaped, I-shaped or C-shaped channel in cross section into which can be received an edge of the paneling 12, 14. As shown, the barriers overlap the gap 42 between an edge of the barriers 16, 18, 20 and 40 and an edge of the paneling 12, 14, thereby blocking any light from escaping from the welding station 30. In some examples, mating of the edges of the barriers and paneling employs a labyrinthine seal at the interface to further ensure light is prevented from escaping from the welding station.

Figure 4A:
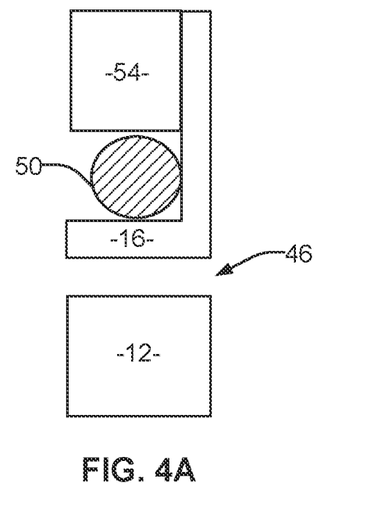
FIGS. 4A, 4C and 4E are partial cross section views of example pneumatic tubes in a partially open configuration, in accordance with aspects of this disclosure.
Figure 4B:
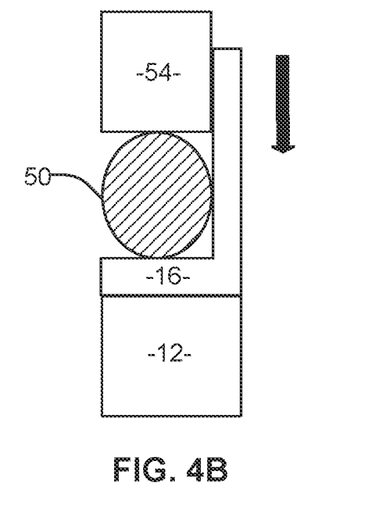
FIGS. 4B, 4D and 4F are partial cross section views of example pneumatic tubes in a closed configuration, in accordance with aspects of this disclosure.

In some examples, one or more of the barriers 16, 18, 20 and 40 are extended in response to inflating a pneumatic tube, thereby closing the gap and sealing the entrance to the loading station 32. An example inflation operation of the pneumatic tube is illustrated in FIGS. 4A and 4B. One of the many advantages of using a pneumatic tube to extend the barriers is that a pneumatic hose, once filled, applies a consistent force across the panel, thereby ensuring a proper seal along the interface between the enclosure and the paneling. Additionally, when deactivated (e.g., the fluid is evacuated from the pneumatic tube), the space required to store the pneumatic tube is much less than that for air cylinders, for example. In particular, a bottom plane of the enclosure has limited space under which to mount air cylinders for actuation of the barrier 18 to seal the paneling. The use of a pneumatic tube provides a solution by providing a flexible and small package.

In some additional or alternative examples, one or more of the barriers 16, 18, 20 and 40 are extended by actuation of one or more of air cylinders, motors, etc.

One or more sensors 29 may be employed to identify alignment of between the edges of the paneling and the edges of the enclosure and/or a presence or a lack of gaps between the edges of the paneling and the edges of the enclosure in the closed configuration. In some examples, the sensor is a magnetically actuated sensor (e.g., a Hall Effect sensor, etc.), an optical sensor (e.g., a camera, an IR camera, a photodiode, etc.), a contact sensor, a mechanically activated switch, or other suitable sensing technique. Sensor data (or absence of data) can be used to determine whether gaps exist, and activate an electronic or physical interlock to prevent a laser welding operation from commencing. In some examples, sensor data (or absence of data) can be provided to a control circuitry (e.g., control circuitry 24), which is configured to determine whether gaps exist. Absence of a gap can be determined, for example, by validating that each sensor has been actuated in response to the edges of the paneling and/or the enclosure making contact or coming into sufficient proximity to actuate (e.g., magnetically actuated sensor, contact sensor, mechanically activated switch, etc.), and/or by measuring an optical signal (e.g., via a light source/sensor arrangement, and/or monitoring for gaps that allow ambient light to pass through).

If the control circuit determines that no gaps exist, the control circuitry allows a laser welding operation to commence. If the control circuitry determines that one or more gaps exist, the control circuitry is configured to one or more of generate an alert that a gap exists, actuate an electronic or physical interlock to prevent a laser welding operation from commencing, and/or adjust one or more features of the system to correct for the gap.

In some examples, the control circuitry can activate the pneumatic tube in response to sensor data indicating the edges of the paneling and the edges of the enclosure are properly aligned. In some examples, the control circuitry can deactivate and/or prevent power from reaching one or more devices or systems. For example, if the interlock is activated, the system may partially or completely enter an inactive status, such that the laser, the robot, the rotational mechanism, the fixturing or clamps are prevented from activation (e.g., in response to detection of a gap). If the interlock is not activated, the system may partially or completely enter an active status, allowing associated systems to activate.

Although illustrated as a single plane rotating about a horizontal axis, in some examples access to the loading station 32 is provided by two or more planes rotating about a horizontal axis or a vertical access. Further, although described with respect to some figures as panel 12 and panel 14 being in a fixed plane with respect to mid-panel 22, in some examples one or both of panel 12 or panel 14 can rotate independently of the other panel.

Figure 2A:
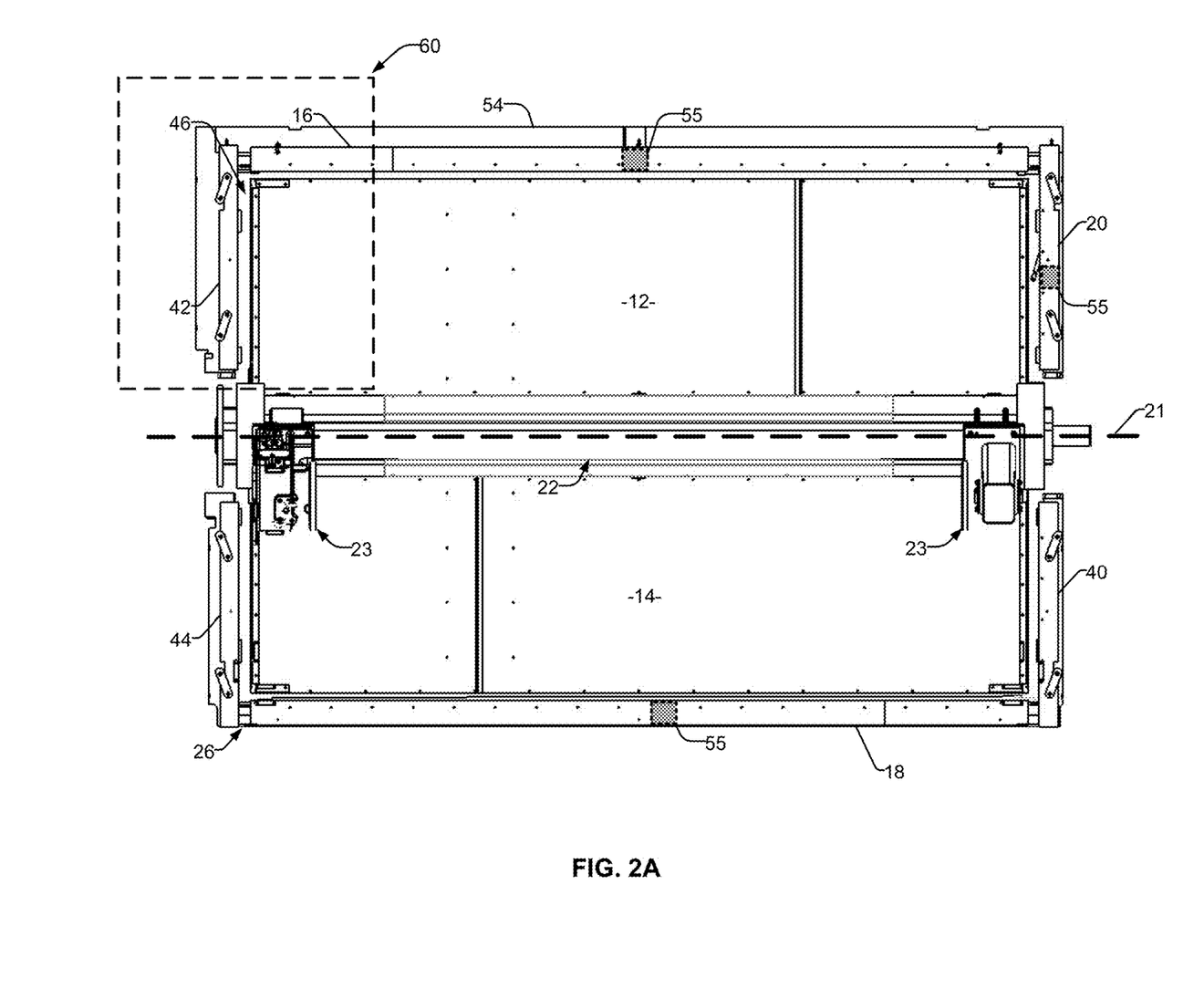
FIG. 2A is an example laser enclosure paneling in a partially open configuration, in accordance with aspects of this disclosure.

FIG. 2A is an example laser enclosure paneling in a partially open configuration. As shown in FIG. 2A, the mid-panel 22 supports paneling 12, 14 located at opposite sides of a centerline or axis 21. In the example of FIG. 2A, the moveable paneling or arc screen can transition between an open configuration (e.g., to provide access to the welding cell) and a closed configuration (e.g., to perform a laser welding operation). The paneling moves by rotating about the axis 21, exposing a gap 46 between edges of the paneling 12, 14 and edges of the barriers 16, 18, 20, 40, 42 and 44. The presence of the gap 46 allows for free rotation of the paneling in the open configuration. In some examples, the horizontally rotating paneling is moved by a pneumatically actuated lifting system, such as system 24.

Figure 2B:
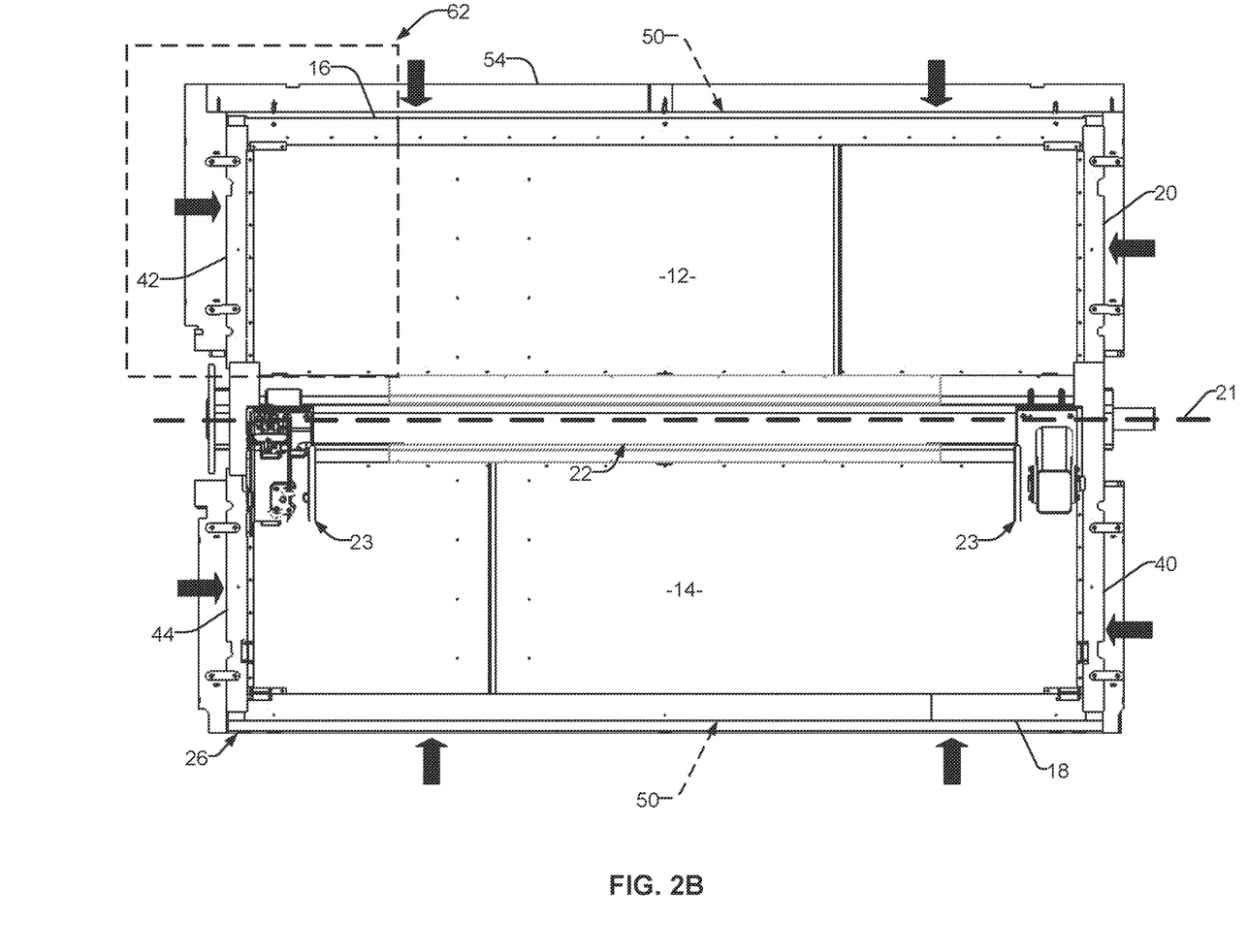
FIG. 2B is an example laser enclosure paneling in a closed configuration, in accordance with aspects of this disclosure.

FIG. 2B is an example laser enclosure paneling in a closed configuration. In the example of FIG. 2B, the edges of the paneling have aligned with edges of the barriers 18, 20, 40, 42 and 44, supported by an enclosure frame 54. In the closed configuration, one or more pneumatic tubes forces the barriers to extend toward the paneling (represented by arrows surrounding the paneling), mating the edges of the barriers and/or enclosure with the edges of the paneling to cover the gap, resulting in a light-tight seal. In disclosed examples, the edges of the enclosure and/or the paneling are configured to mate, defined as making contact, adjoining, or abutting of two surfaces or edges, and may include one or more features of one or more of the edges overlapping an opposing edge or surface.

Figure 3A:
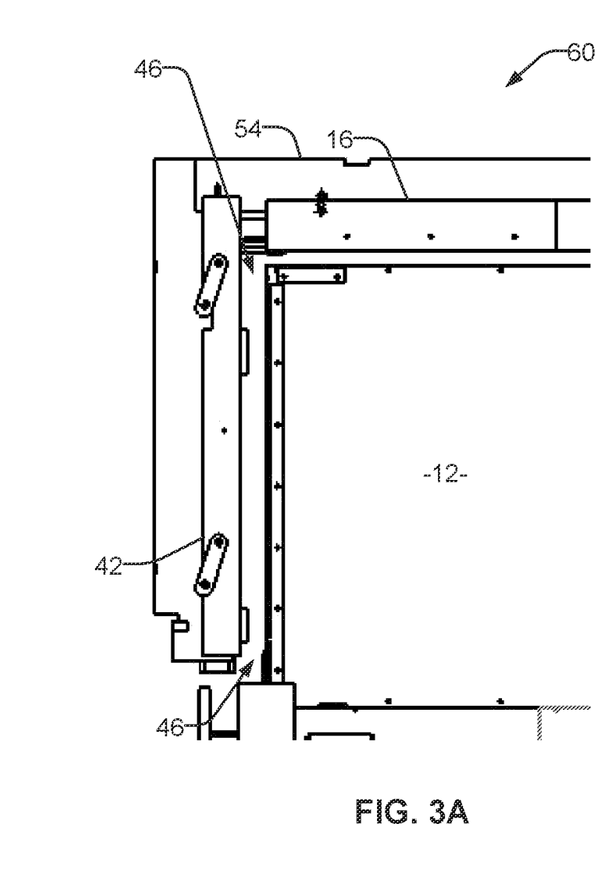
FIG. 3A is a detailed view of the paneling in a partially open configuration of FIG. 2A, in accordance with aspects of this disclosure.

FIG. 3A is a detailed view of the paneling in a partially open configuration, as shown in dotted lines 60 in FIG. 2A. FIG. 3A illustrates the gap 46 at the top (and bottom) and the left (and right) sides of the paneling, as the barriers 16 and 40 are retracted into frame 54 of the enclosure. In other words, the pneumatic tubes (or other actuator) are deactivated, such that the aforementioned springs bias the barriers away from the paneling to allow for rotation into the open configuration.

Figure 3B:
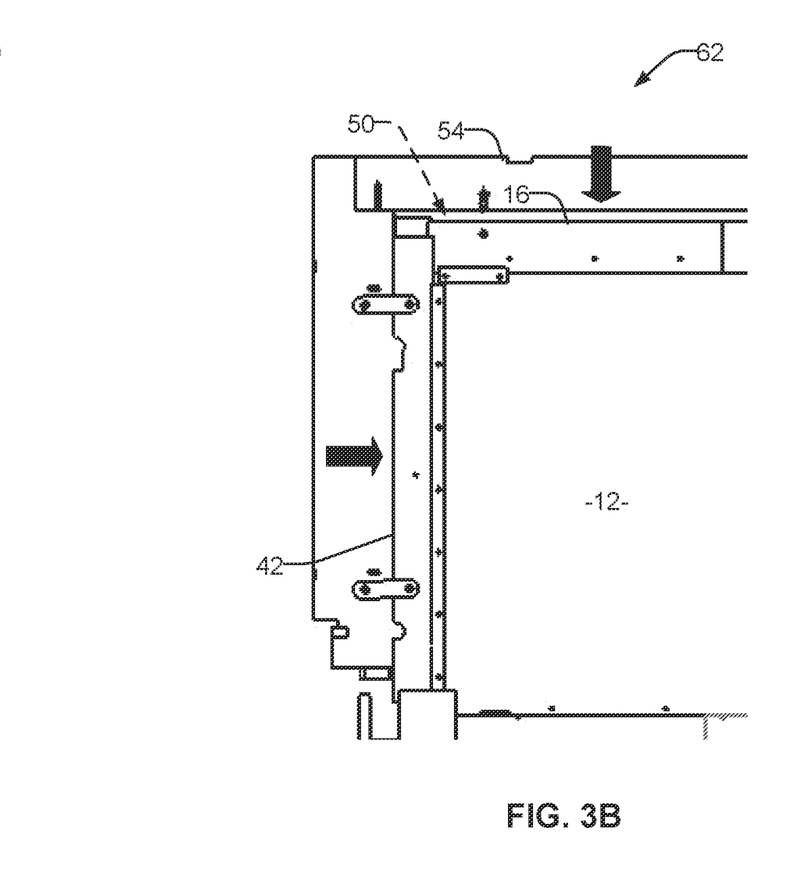
FIG. 3B is a detailed view of the paneling in a closed configuration of FIG. 2B, in accordance with aspects of this disclosure.

FIG. 3B is a detailed view of the paneling in a closed configuration, as shown in dotted lines 62 in FIGS. 2B. 3B illustrates the barriers 16 and 40 extended toward the paneling from frame 54. In other words, the pneumatic tubes (or other actuator) have been activated, such that the gap 46 between the edges of the barriers and the paneling is closed by extension of the barriers. Although typically hidden within the frame 54, a pneumatic tube 50 is arranged between a barrier and the paneling, as further described with respect to FIGS. 4A and 4B.

FIG. 4A is a partial cross section view of an example pneumatic tube in a partially open configuration, whereas FIG. 4B is a partial cross section view of an example pneumatic tube in a closed configuration. In the example of FIG. 4A, pneumatic tube 50 is arranged between the frame 54 and barrier 16. The pneumatic tube 50 is partially or completely evacuated of fluid, such that the gap 46 exists between the barrier 16 and the panel 12 as the force from the springs biases the barrier 16 toward the frame 54 and away from the panel.

In the example of FIG. 4B, activation of a closed configuration partially or completely fills the pneumatic tube 50 with a fluid (e.g., a gas, air, a liquid, a fluid media, etc.). The presence of the fluid increases the pressure in the tube 50 such that an external boundary of the tube expands. The expansion forces the barrier 16 toward the edges of the paneling 12, thereby closing the gap 46 and providing a light-tight enclosure. To transition from the closed configuration to the open configuration, the fluid is partially or completely removed from the pneumatic tube, such that the tube deflates retracting the barrier 16 and exposing the gap 46 between edges. In some examples, the barrier(s) and/or the pneumatic tube(s) is additionally or alternatively located on an edge of the paneling.

Figure 4C:
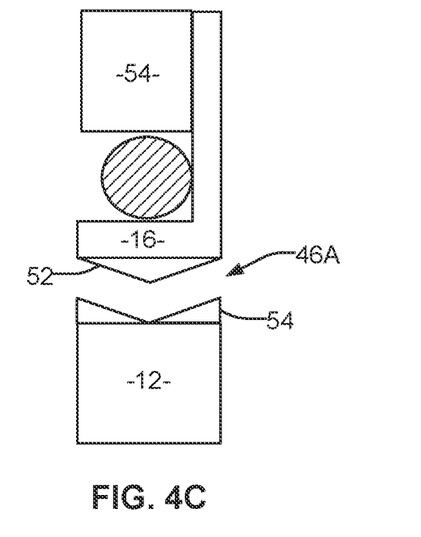
Figure 4D:
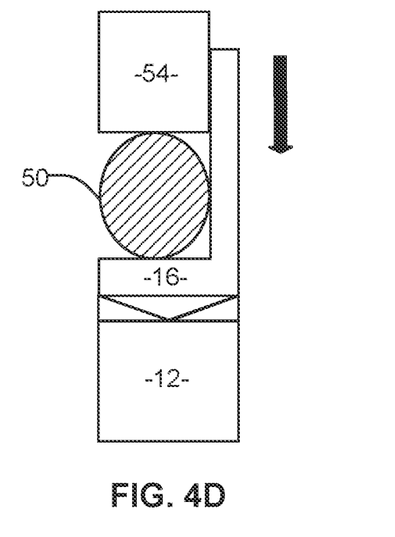

FIG. 4C illustrates a partial cross section view of another example pneumatic tube 50 in a partially open configuration. As shown in FIG. 4C, the barrier 16 incorporates an extension 52 configured to mate with a tapered receiver 56 on the paneling 12. In the open configuration, a gap 46A is exposed between the barrier 16 and the paneling 12. When the pneumatic tube 50 is filled, as shown in FIG. 4D, the gap 46 between the frame 54 and the barrier 16 closes. In the example of FIGS. 4C and 4D, the path through the gap 46A is non-linear and/or non-uniform, resulting in a tortuous path further limiting opportunities for light, gas, etc., to escape the enclosure.

Figure 4E:
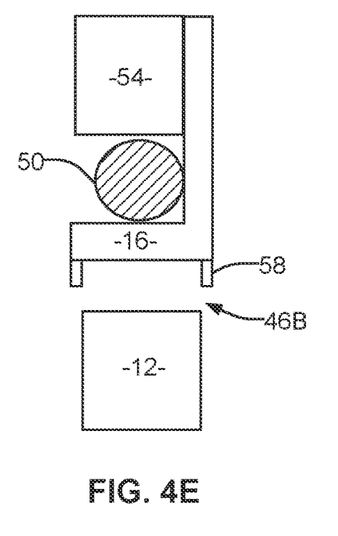
Figure 4F:
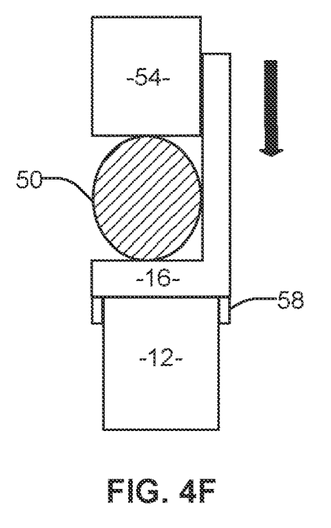

FIG. 4E illustrates a partial cross section view of yet another example pneumatic tube 50 in a partially open configuration. As shown in FIG. 4E, the barrier 16 incorporates an extension 58 configured to contact, surround, overlap, and/or create a seal with the paneling 12. In the open configuration, a gap 46B is exposed between the barrier 16 and the paneling 12. When the pneumatic tube 50 is filled, as shown in FIG. 4F, the gap 46B between the frame 54 and the barrier 16 closes. In the example of FIGS. 4E and 4F, the path through the gap 46B is closed and/or blocked, resulting in a closure and/or seal limiting opportunities for light, gas, etc., to escape the enclosure.

Although some examples are illustrated as separate systems, in some examples, one or more of the mating devices and/or techniques may be applied to seal a single enclosure. For instance, a first barrier interface may incorporate an extension, where a second barrier interface is substantially flat.

Further, although some examples are illustrated with paneling and/or barriers having generally straight edges, in some examples one or more edges have other geometric and/or complex shapes. The use of one or more interfaces (e.g., employing a flexible extension) may yield favorable results in some applications (e.g., along a non-linear edge).

In some examples, the extensions (and/or coverings) attached to the one or more edges may include a flexible and/or malleable material at an interface between edges (e.g., rubber, flexible plastic, etc.). Such extensions and/or coverings are configured to aid in alignment of the edges, and/or facilitating a light-preventing seal.

Figure 5:
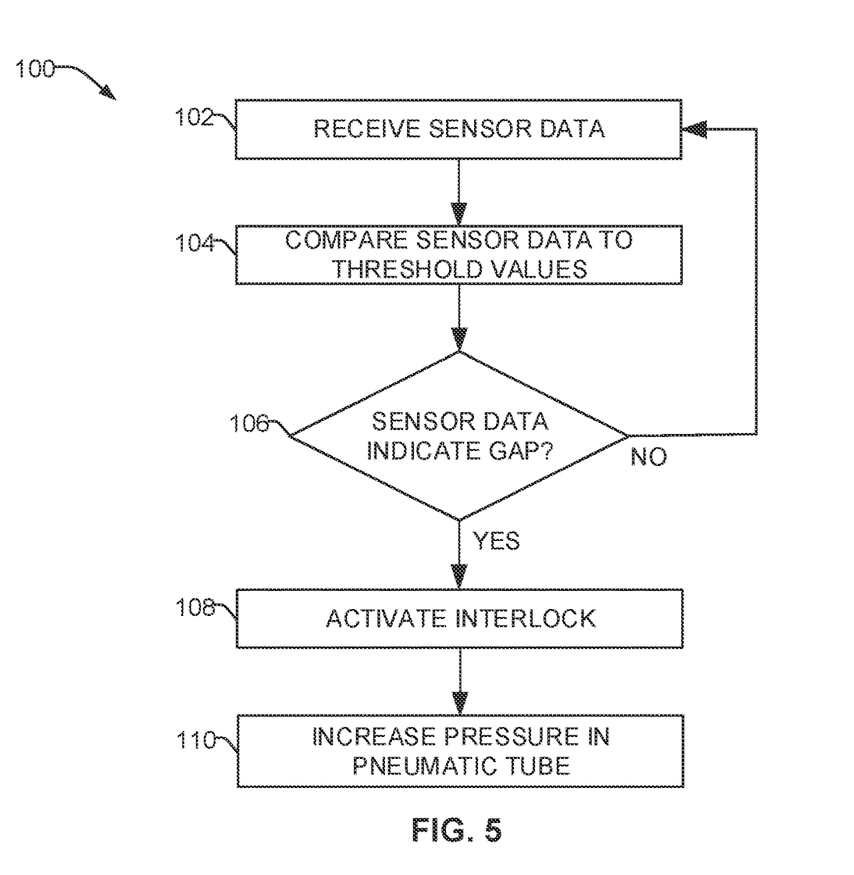
FIG. 5 is a flowchart illustrating an example process for activating an interlock, in accordance with aspects of this disclosure.

FIG. 5 is a flowchart illustrating an example process 100 for activating an interlock In some examples, the process 100 may be initiated automatically and executed via control circuitry 24 in accordance with instructions stored in an associated memory. At block 102, the control circuitry receives sensor data from the one or more sensors. At block 104, the control circuitry compares the sensor data to one or more threshold values. In some examples, the threshold values correspond to metrics associated with a gap between respective edges. For example, a signal (e.g., electromagnetic, optical, etc.) may be transmissible and detected through the gap at one or more locations along the interface; a contact sensor may indicate the respective edges fail to make contact at one or more locations along the interface; a magnetic sensor may indicate a distance remains between the respective edges at one or more locations along the interface; etc.

At block 106, the control circuitry determines whether a gap exists between respective edges based on the sensor data. If no gap exists, the process 100 returns to block 102 to continue to monitor sensor data.

If a gap does exist, the process 100 proceeds to block 108, where the control circuitry activates an interlock to prevent a laser welding operation from commencing in response to a determination that a gap exists. In optional block 110, the control circuitry is further configured to control a fluid source or a valve connected to the fluid source to increase a pressure within the pneumatic tube in response to a determination that a gap exists. This may narrow the distance between the edges of the barriers with the edges of the paneling, thereby closing any gaps.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, blocks and/or components of disclosed examples may be combined, divided, re-arranged, and/or otherwise modified. Therefore, it is intended that the present method and/or system not be limited to the particular implementations disclosed, but that the present method and/or system will include all implementations falling within the scope of the appended claims, both literally and under the doctrine of equivalents.

What is claimed is:

1. An enclosure providing a sealed environment comprising:
   paneling having upper and lower panels that rotate about a horizontal axis to transition between an open configuration and a closed configuration, the paneling having one or more edges;
   one or more pneumatic tubes configured to expand in response to an injection of fluid in a closed configuration, and to retract in response to removal of the fluid in an open configuration; and
   one or more barriers having one or more edges configured to contact or overlap with an edge of the one or more edges of the paneling, wherein the one or more pneumatic tubes are arranged between a frame of the enclosure and the one or more edges of the one or more barriers, such that the one or more pneumatic tubes are configured to expand thereby extending the one or more barriers toward the paneling to contact or overlap the one or more edge of the one or more barriers with the edge of the paneling.

2. The enclosure of claim 1, wherein the barriers are biased away from the paneling in the open configuration.

3. The enclosure of claim 1, further comprising a laser welder to perform a laser welding operation in the closed configuration.

4. The enclosure of claim 1, further comprising one or more of clamps or fixtures to secure a workpiece in the sealed environment.

5. The enclosure of claim 1, further comprising a compressed air source to fill the one or more pneumatic tubes.

6. The enclosure of claim 5, wherein the fluid is one or more of air, gas, or a liquid.

7. The enclosure of claim 1, wherein the paneling is configured for rotation without power.

8. An enclosure providing a sealed environment comprising:
   one or more pneumatic tubes configured to expand in response to an injection of fluid in a closed configuration of a panel enclosing the sealed environment, and to retract in response to removal of the fluid in an open configuration of the panel; and
   one or more barriers configured to move between the open and closed configurations in response to expansion or retraction of the one or more pneumatic tubes, wherein one or more edges of the one or more barriers is configured to contact or overlap an edge of the panel enclosing the sealed environment in the closed configuration.

9. The enclosure of claim 8, wherein the one or more pneumatic tubes are arranged between a frame of the enclosure and the one or more barriers.

10. The enclosure of claim 9, wherein the one or more pneumatic tubes are configured to expand, thereby extending the one or more barriers toward the panel to mate the edges of the one or more barriers with the edge of the panel.

11. The enclosure of claim 8, wherein the panel is an upper panel fixed to a lower panel at a horizontal axis.

12. The enclosure of claim 8, wherein the panel is mechanically secured to the enclosure in the closed configuration to prevent rotation of the panel.

13. An enclosure providing a sealed laser welding environment comprising:
   paneling having upper and lower panels that rotate about a horizontal axis to transition between an open configuration and a closed configuration, the paneling having one or more edges;
   one or more pneumatic tubes configured to expand in response to an injection of fluid in a closed configuration, and to retract in response to removal of the fluid in an open configuration;
   one or more barriers having one or more edges configured to contact or overlap an edge of the one or more edges of the paneling, such that the one or more pneumatic tubes are configured to expand thereby extending the one or more barriers toward the paneling to contact or overlap the one or more edge of the one or more barriers with the edge of the paneling; and
   one or more sensors to monitor alignment of and for gaps between the one or more edge of the one or more barriers with the edge of the paneling.

14. The enclosure of claim 13, further comprising control circuitry configured to:
   receive sensor data from the one or more sensors;
   compare the sensor data to one or more threshold values; and
   activate an interlock in response to the sensor data exceeding the one or more threshold values.

15. The enclosure of claim 14, further comprising control circuitry configured to:
   receive sensor data from the one or more sensors; and
   determine whether a gap exists between respective edges based on the sensor data.

16. The enclosure of claim 15, wherein the interlock prevents a laser welding operation from commencing in response to a determination that a gap exists between the one or more edge of the one or more barriers with the edge of the paneling.

* * * * *